US012757143B2

(12) United States Patent
Ye et al.

(10) Patent No.: US 12,757,143 B2
(45) Date of Patent: Oct. 6, 2026

(54) COMMUNICATION DEVICES AND METHODS FOR SIGNALING IN NON-TERRESTRIAL NETWORKS

(71) Applicant: Apple Inc., Cupertino, CA (US)

(72) Inventors: Chunxuan Ye, San Diego, CA (US); Dawei Zhang, Saratoga, CA (US); Wei Zeng, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Sarma V. Vangala, Campbell, CA (US); Pavan Nuggehalli, San Carlos, CA (US); Haijing Hu, Los Gatos, CA (US); Weidong Yang, San Diego, CA (US); Sigen Ye, Whitehouse Station, NJ (US); Alexander Sirotkin, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 1127 days.

(21) Appl. No.: 17/852,208

(22) Filed: Jun. 28, 2022

(65) Prior Publication Data

US 2023/0039715 A1 Feb. 9, 2023

Related U.S. Application Data

(60) Provisional application No. 63/229,997, filed on Aug. 5, 2021.

(51) Int. Cl.
*H04W 56/00* (2009.01)
*H04B 7/185* (2006.01)
(Continued)

(52) U.S. Cl.
CPC ...... *H04W 56/005* (2013.01); *H04B 7/18539* (2013.01); *H04B 7/19* (2013.01); *H04W 84/06* (2013.01)

(58) Field of Classification Search
CPC ............... H04W 56/005; H04W 84/06; H04W 56/0045; H04W 56/006; H04W 74/0833;
(Continued)

(56) References Cited

U.S. PATENT DOCUMENTS

| | | | |
|---|---|---|---|
| 2021/0105731 | A1 | 4/2021 | Lin |
| 2021/0105761 | A1 | 4/2021 | Cheng et al. |

(Continued)

FOREIGN PATENT DOCUMENTS

| | | | |
|---|---|---|---|
| CN | 116830687 | A | 9/2023 |
| WO | 2021147898 | A1 | 7/2021 |

OTHER PUBLICATIONS

Feature Lead Summary#5 on Timing Relationship Enhancements, R1-2106325, 3GPP TSG-RAN WG1 Meeting #105- e, May 10-27, 2021, 76 pages.

(Continued)

*Primary Examiner* — Ashley Shivers
(74) *Attorney, Agent, or Firm* — Kilpatrick Townsend & Stockton LLP

(57) ABSTRACT

The present application relates to devices and components including apparatus, systems, and methods for ephemeris signaling in wireless networks.

15 Claims, 7 Drawing Sheets

(51) Int. Cl.
*H04B 7/19* (2006.01)
*H04W 84/06* (2009.01)

(58) Field of Classification Search
CPC .. H04B 7/18539; H04B 7/19; H04B 7/18513; H04L 1/1812
See application file for complete search history.

(56) References Cited

U.S. PATENT DOCUMENTS

| | | | | |
|---|---|---|---|---|
| 2023/0117959 A1* | 4/2023 | Tripathi | H04W 56/0045 370/328 |
| 2023/0189088 A1* | 6/2023 | Shin | H04B 7/18513 455/427 |
| 2024/0259088 A1* | 8/2024 | Rune | H04B 7/18532 |

OTHER PUBLICATIONS

Status Report to TSG, RP-210986, 3GPP TSG RAN meeting #92-e, Jun. 14-18, 2021, 27 pages.
Timing Relationship Enhancements for nr ntn, R1-2105101, 3GPP TSG RAN WG1 #105-e, May 10-27, 2021, 6 pages.
European Patent Application No. 24150574.2, Extended European Search Report, May 3, 2024, 11 pages.
Discussion on Timing Relationship Enhancement, OPPO, 3GPP TSG RAN WG1 #105-e, R1-2105969, XP052011824, May 10-27, 2021, 4 pages.
Timing Relationship Enhancement for NTN, CATT, 3GPP TSG RAN WG1 #105-e, R1-2104516, XP052010839, May 19-27, 2021, 5 pages.
European Patent Application No. 22184235.4, Partial European Search Report, Dec. 19, 2022, 13 pages.
FL summary #1 of AI 8.15.3: Timing relationship for IoT-NTN, Sony, 3GPP TSG RAN WG1 #104bis-e, R1-21xxxx, Apr. 12-20, 2021, 35 pages.
3rd Generation Partnership Project; Technical Specification Group Radio Access Network; NR; Medium Access Control (MAC) protocol specification (Release 16), 3GPP TS 38.321 V16.5.0, Jun. 2021, 157 pages.
3rd Generation Partnership Project; Technical Specification Group Radio Access Network; NR; Radio Resource Control (RRC) protocol specification (Release 16), 3GPP TS 38.331 V16.5.0, Jun. 2021, 959 pages.
Enhancements on UL Time and Frequency Synchronization for NTN, Samsung, 3rd Generation Partnership Project, Technical Specification Group-Radio Access Network Working Group 1 #105-e meeting, R1-2105307, May 10-27, 2021, 13 pages.
TA Adjustment in RRC Connected state, 3rd Generation Partnership Project Technical Specification Group-Radio Access Network Working Group 2 Meeting #113 bis electronic, R2-2103826, Apr. 12-20, 2021, 4 pages.
China Patent Application No. 202210821885.6, Office Action, Jun. 28, 2025, 17 pages.
European Patent Application No. 22184235.4, Office Action, Apr. 25, 2025, 8 pages.
European Patent Application No. 22184235.4, Extended European Search Report, Mar. 21, 2023, 13 pages.
Uplink Time and Frequency Synchronization for NTN, Apple, 3GPP TSG RAN WG1 #106-e, R1-210xxxx, Apr. 16-27, 2021, 6 pages.
Timing Relationship Enhancements for NR NTN, Apple, 3GPP TSG RAN WG1 #106-e, R1-210xxxx, Apr. 16-27, 2021, 8 pages.
China Patent Application No. 202210821885.6, Notice of Decision to Grant, May 11, 2026, 6 pages.

* cited by examiner

COMMUNICATION DEVICES AND METHODS FOR SIGNALING IN NON-TERRESTRIAL NETWORKS

CROSS-REFERENCE TO RELATED APPLICATION

This application claims the benefit of U.S. Provisional Patent Application No. 63/229,997, filed Aug. 5, 2021, which is herein incorporated by reference in its entirety for all purposes.

BACKGROUND

As wireless networks have developed, the networks have developed to service more areas and more remote areas. An approach that has been proposed for the wireless networks to service more areas and more remote areas is the utilization of non-terrestrial networks. In particular, satellites may be utilized within the networks to provide radio access network (RAN) service. The use of the satellites within the networks presents many challenges.

DETAILED DESCRIPTION

Figure 1:
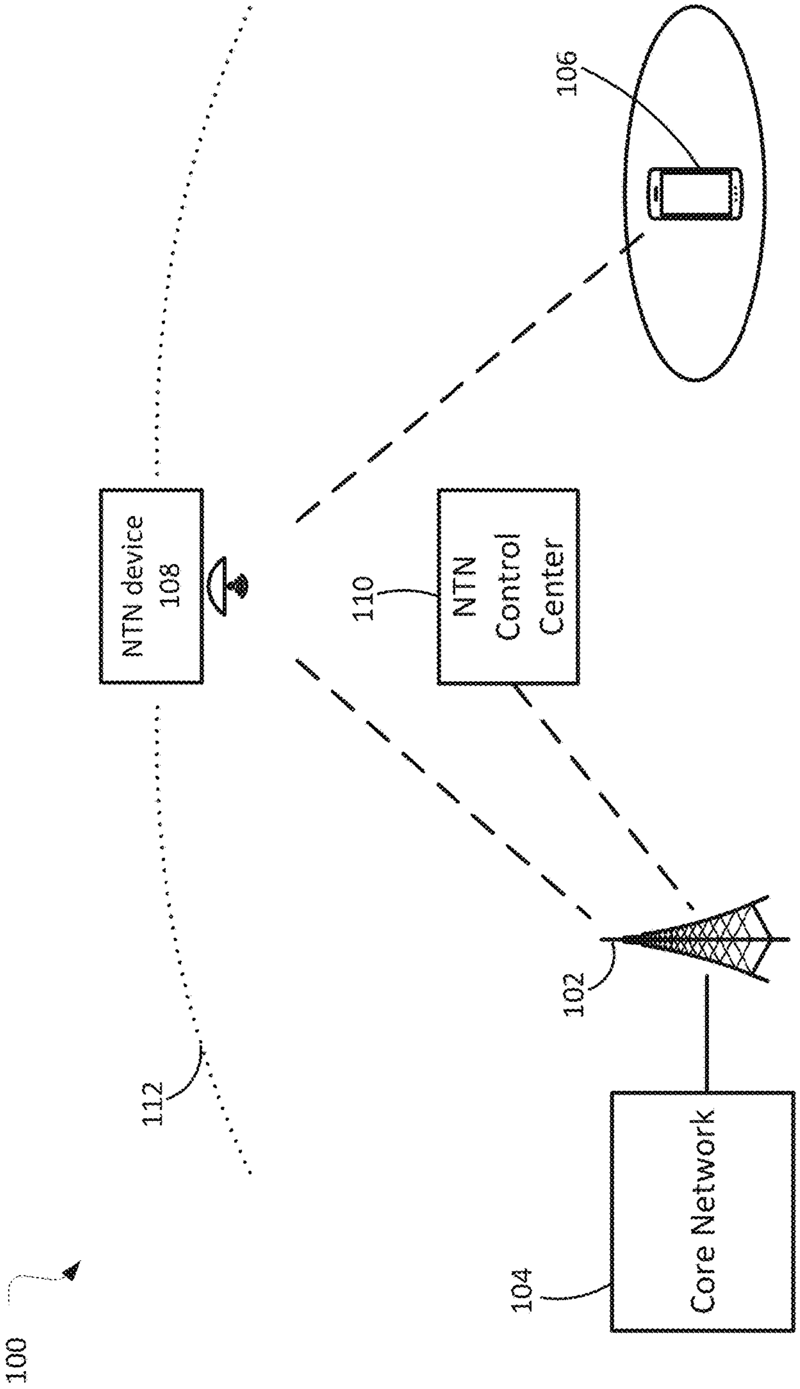
FIG. 1 illustrates a network arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application-specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates an example network arrangement 100 in accordance with some embodiments. In particular, the network arrangement 100 may employ one or more non-terrestrial components and may, therefore, be referred to as a non-terrestrial network (NTN). The network arrangement 100 is a simplified version illustrating a single representation of each element for clarity and brevity. It should be understood that one or more of each of the elements may be present in embodiments of the network arrangement 100.

The network arrangement 100 may include a base station 102. The base station 102 may, in combination with other components within the network arrangement 100, provide radio access network (RAN) services to UEs. The base station 102 may comprise a nodeB. For example, the base station 102 may comprise a next generation nodeB (gNB), an evolved nodeB (eNB), or another type of nodeB.

The network arrangement 100 may further include a core network (CN) 104. For example, the CN 104 may comprise a $5^{th}$ Generation Core network (5GC). The CN 104 may be coupled to the base station 102 via a fiber optic or wireless backhaul. The CN 104 may provide functions for the UEs that form a connection with the base station 102, such as subscriber profile information, subscriber location, authentication of services, and/or switching functions for voice and data sessions.

The network arrangement 100 may further include a UE 106. The UE 106 may be configured to establish a connection with a WAN and provide services of the WAN to a user of the UE 106. For example, the UE 106 may be configured to establish a wireless connection to a portion of a WAN, such as the base station 102.

The network arrangement 100 may further include an NTN device 108. For example, the NTN device 108 may comprise an earth-fixed satellite (such as a geosynchronous (GEO) earth orbit satellite or a high altitude platform station (HAPS)), a quasi-earth-fixed satellite (such as a non-geostationary Earth orbit (NGEO) satellite with steerable beam), or an Earth-moving satellite (such as an NGEO with fixed or non-steerable beam). The NTN device 108 may proceed along a course 112 during operation.

The NTN device 108 may facilitate a wireless connection between the base station 102 and the UE 106 by relaying signals between the two network devices. The signals may be relayed over a first service link between the NTN device 108 and the base station 102 and a second service link between the NTN device 108 and the UE 106. The base station 102 or the UE 106 may benefit from having ephemeris information regarding the position or the course 112 of the NTN device 108 to establish and maintain these service links.

The network arrangement 100 may support Earth-fixed, quasi-Earth-fixed, and Earth-moving satellite service links. Earth-fixed satellite service links may be implemented by providing beam(s) that continuously cover the same geographical areas all the time (for example, the case of GEO satellites and HAPS). Quasi-Earth-fixed satellite service links may be implemented by providing beam(s) that cover one geographic area for a finite period and a different geographic area during another period (for example, the case of NGEO satellites generating steerable beams). Earth-moving satellite service links may be implemented by providing beam(s) that have a foot print that slides over the Earth surface (for example, the case of NGEO satellites generating fixed or non-steerable beams).

The network arrangement 100 may further include a NTN control center 110. The NTN control center 110 may store the ephemeris information regarding the position or the course of one or more NTN devices within a constellation of NTN devices. As an example, the NTN control center 110 may store information regarding the position or the course of the NTN device 108 in the illustrated embodiment.

Signaling aspects may be complicated based on the large distances between the terrestrial components of the network arrangement (for example, the NTN device 108) and the non-terrestrial components of the network arrangement 100 (for example, the base station 102 and the UE 106). Embodiments describe timing relationship enhancements and uplink time/frequency synchronization that may be used in the network arrangement 100.

The timing relationship enhancements may be related to introducing an additional time offset to compensate for the large propagation delay in NTNs.

In some embodiments, the UE 106 may use a K_offset for determining various timing relationships. A K_offset transmitted in system information may be referred to as a cell-specific K_offset. This K_offset may be updated to a UE-specific K_offset after an initial access through control signaling such as, for example, radio resource control (RRC)

reconfiguration or media access control (MAC) control element (CE). If the UE 106 is not provided with a K_offset value other than the one signaled in system information, the K_offset value signaled in the system information may be used for all timing relationships that are based on K_offset enhancement.

The K_offset transmitted in the system information may be used for determining the transmission timing of: random access response (RAR)/fall back RAR grant scheduled PUSCH; message three (Msg3) retransmission scheduled by DCI format 0_0 with cyclic redundancy check (CRC) scrambled by temporary cell (TC)-radio network temporary identity (RNTI); hybrid automatic repeat request (HARQ)-acknowledgment (ACK) on PUCCH to be used for contention resolution with respect to PDSCH scheduled by DCI format 1_0 with CRC scrambled by TC-RNTI; or HARQ-ACK on PUCCH that corresponds to message B (MsgB) scheduled by DCI format 1_0 with CRC scrambled by MsgB-RNTI.

In some embodiments, the base station 102 may update the K_offset for better scheduling purpose. The base station 102 may not know a UE-specific timing advance (TA) without having knowledge of the UE's global navigation satellite system (GNSS) location. Thus, the UE 106 may report information about a UE-specific TA to the base station 102 to allow the base station 102 to properly update the UE-specific K_offset.

In some embodiments, the reporting contents from the UE 106 may be based on an assumption that the UE 106 is to use its full TA. The full TA may be converted from x milliseconds to X slots. The current UE-specific K_offset may be Y slots, which may be converted toy milliseconds. If the UE-specific K_offset is not configured, the cell-specific K_offset may be used.

In some embodiments, the UE 106 may transmit a UE-specific K_offset report based on a difference between the UE-specific K_offset and the TA. For example, given thresholds a and b, if $a \le Y-X \le b$, then the UE 106 may determine that there is no need for a UE-specific K_offset update. In this case, the UE 106 may generate and send a report to the base station 102 with an indication that the UE-specific K_offset does not need to be updated, or it may include an amount of update set equal to zero slots. Alternatively, the UE 106 may simply not transmit a report at all.

If $Y-X>b$, then the UE 106 may determine that there is a need for a UE-specific K_offset update. In this event, the UE 106 may report a need to decrease the UE-specific K_offset.

In a first option, reporting the need to decrease the UE-specific K_offset may include transmitting a report with an indicator to decrease the UE-specific K_offset by one step, which may be one slot in some embodiments. The indicator may be a one-bit indicator.

In a second option, reporting the need to decrease the UE-specific K_offset may include transmitting a report with a differential UE-specific K_offset value. The K_offset value may provide an amount of decreasing slots, which may depend on (or be proportional to) the value $Y-X$. For example, the report may include a two-bit indicator to indicate that the current K_offset is to be decreased by 1, 2, 3, or 4 slots.

In a third option, reporting the need to decrease the UE-specific K_offset may include transmitting a report with an indication of an actual UE-specific K_offset. In some embodiments, the indication may use A bits, where A is an integer.

If $Y-X<a$, then the UE 106 may determine that there is a need to increase the UE-specific K_offset.

In a first option, reporting the need to increase the UE-specific K_offset may include transmitting a report with an indicator to increase the UE-specific K_offset by one step, which may be one slot in some embodiments. The indicator may be a one-bit indicator.

In a second option, reporting the need to increase the UE-specific K_offset may include transmitting a report with a differential UE-specific K_offset value. The K_offset value may provide an amount of increasing slots, which may depend on (or be reverse proportional to) the value $Y-X$. For example, the report may include a two-bit indicator to indicate that the current K_offset is to be increased by 1, 2, 3, or 4 slots.

In a third option, reporting the need to increase the UE-specific K_offset may include transmitting a report with an indication of an actual UE-specific K_offset. In some embodiments, the indication may use A bits, where A is an integer.

While the above embodiments describe comparing the TA to the K_offset in units of slots (for example, X and Y), other embodiments may compare the TA to the K_offset in units of milliseconds (for example, x and y).

The values of the thresholds a and b may depend on a subcarrier spacing (SCS). For example, the larger the SCS, the larger a and b. In some embodiments, these values may be predefined or configured by RRC or system information (for example, SIBs). The values may depend on the type of orbit of the NTN device 108, for example, GOE, LEO, etc.

In some embodiments, the UE reporting contents may be based on a UE full TA or a UE-specific TA. A TA report may have a coarse granularity of one or more slots.

In some embodiments, a difference between an updated TA and previous TA may be used to determine whether a UE-specific K_offset needs to be updated.

Consider $TA_{old}$ to be the TA when the UE 106 receives a UE-specific K_offset and $TA_{new}$ to be a current TA value. If $|TA_{new}-TA_{old}| \le c$, then the UE 106 may determine that no update to the UE-specific K_offset is needed. In this case, the UE 106 may generate and send a report to the base station 102 with an indication that the UE-specific K_offset does not need to be updated, or it may include an amount of update set equal to zero slots. Alternatively, the UE 106 may simply not transmit a report at all.

If $|TA_{new}-TA_{old}|>c$, then the UE 106 may determine there is a need for a UE-specific K_offset update. In this event, the UE 106 may report a need to decrease or increase the UE-specific K_offset.

In a first option, reporting the need to decrease or increase the UE-specific K_offset may include transmitting a report with an indicator to decrease or increase the UE-specific K_offset by one step, which may be one slot in some embodiments. The indicator may be a one-bit indicator.

In a second option, reporting the need to decrease or increase the UE-specific K_offset may include transmitting a report with a differential UE-specific K_offset value. The K_offset value may provide an amount of increasing or decreasing slots, which may depend on (or be proportional to) the value $|TA_{new}-TA_{old}|$. For example, the report may include a two-bit indicator to indicate that the current K_offset is to be increased or decreased by 1, 2, 3, or 4 slots.

In a third option, reporting the need to increase or decrease the UE-specific K_offset may include transmitting a report with an indication of an actual UE-specific K_offset. In some embodiments, the indication may use A bits, where A is an integer.

In some embodiments, if $|TA_{new}-TA_{old}|>c$, then the UE 106 may report updated TA values. The updated TA value report may be in a coarse granularity, for example one or more slots. The reported value may be a differential TA value, for example, the value of $|TA_{new}-TA_{old}|$; or may be an actual TA value, for example, $TA_{new}$.

In some embodiments, the values of c may be based on subcarrier spacing, for example, the larger the SCS, the larger c.

In some embodiments, the values of c may be predefined or configured by RRC signaling or system information signaling (e.g., SIB).

In some embodiments, the values of c may be based on orbit of the NTN device 108 (for example, GEO, LEO, etc.).

Some embodiments may provide event-triggered or periodic based reports for reporting the need to update UE-specific K_offset. For example, event triggered report may be based on the UE 106 detecting Y−X>b; Y−X<a; or $|TA_{new}-TA_{old}|>c$. In some embodiments, as mentioned above, the report may only be transmitted in the event that the UE-specific K_offset needs to be increased or decreased. The report may not be sent if it is determined that the UE-specific K_offset value does not need to be changed.

Periodic reporting may be accomplished by providing the UE 106 a configured grant to report the need for UE-specific K_offset updates.

Additional aspects of K_offset reporting are as follows.

Based on the signaling of updating K_offset after initial access, the updated K_offset is likely to be UE-specific. The value of UE-specific K_offset may be larger than UE's full timing advance (TA) in order to achieve casual scheduling.

The UE's full TA is composed of UE-specific TA, broadcasted common TA, as well as TA command received from gNB. The UE-specific TA depends on the distance between UE and serving satellite, which is calculated by UE based on its GNSS location and serving satellite ephemeris. Note that gNB is unable to autonomously derive UE-specific TA, without the knowledge of UE's GNSS location. If UE does not report the information about UE-specific TA to gNB, then gNB is unable to know whether and how to update UE-specific K_offset.

The UE may report information about the UE-specific TA pre-compensation in some instances. The exact content and frequency of UE reporting of information about the UE-specific TA pre-compensation may yet be determined.

Options of the exact content of UE reporting to gNB may include UE-specific TA, full TA, UE location, difference between UE-specific K_offset and cell-specific K_offset.

A purpose of UE reporting to gNB is to facilitate gNB's derivation of UE-specific K_offset for uplink scheduling adaptation. Since K_offset is assumed to have granularity of slots, the UE's reporting does not need to have a smaller granularity. This could save the signaling overhead of UE reporting. In this sense, it is preferred for UE to report suggested UE-specific K_offset directly.

The signaling overhead could be further reduced if differential value is reported. Specifically, UE may compare current UE-specific K_offset (if not configured, then current cell-specific K_offset) with its full TA. If the difference between them is beyond a certain range, then UE knows the necessity of updating UE-specific K_offset. Otherwise, there is no need for UE to update UE-specific K_offset. Instead of reporting a preferred UE-specific K_offset, UE could report the difference between its preferred UE-specific K_offset and the current UE-specific K_offset. This could further reduce the signaling overhead of UE reporting.

Thus, in some embodiments, the UE may report the suggested differentiated UE-specific K_offset for the purpose of uplink scheduling adaptation.

The UE reporting frequency may be event-triggered. For example, a UE reports to gNB only if it detects the necessity of updating UE-specific K_offset. This could largely save the signaling of UE reporting. The transmission of differentiated UE-specific K_offset could be via high layer signaling. Thus, some embodiments support at least event-triggered UE reporting for the purpose of uplink scheduling adaptation.

Figure 2:
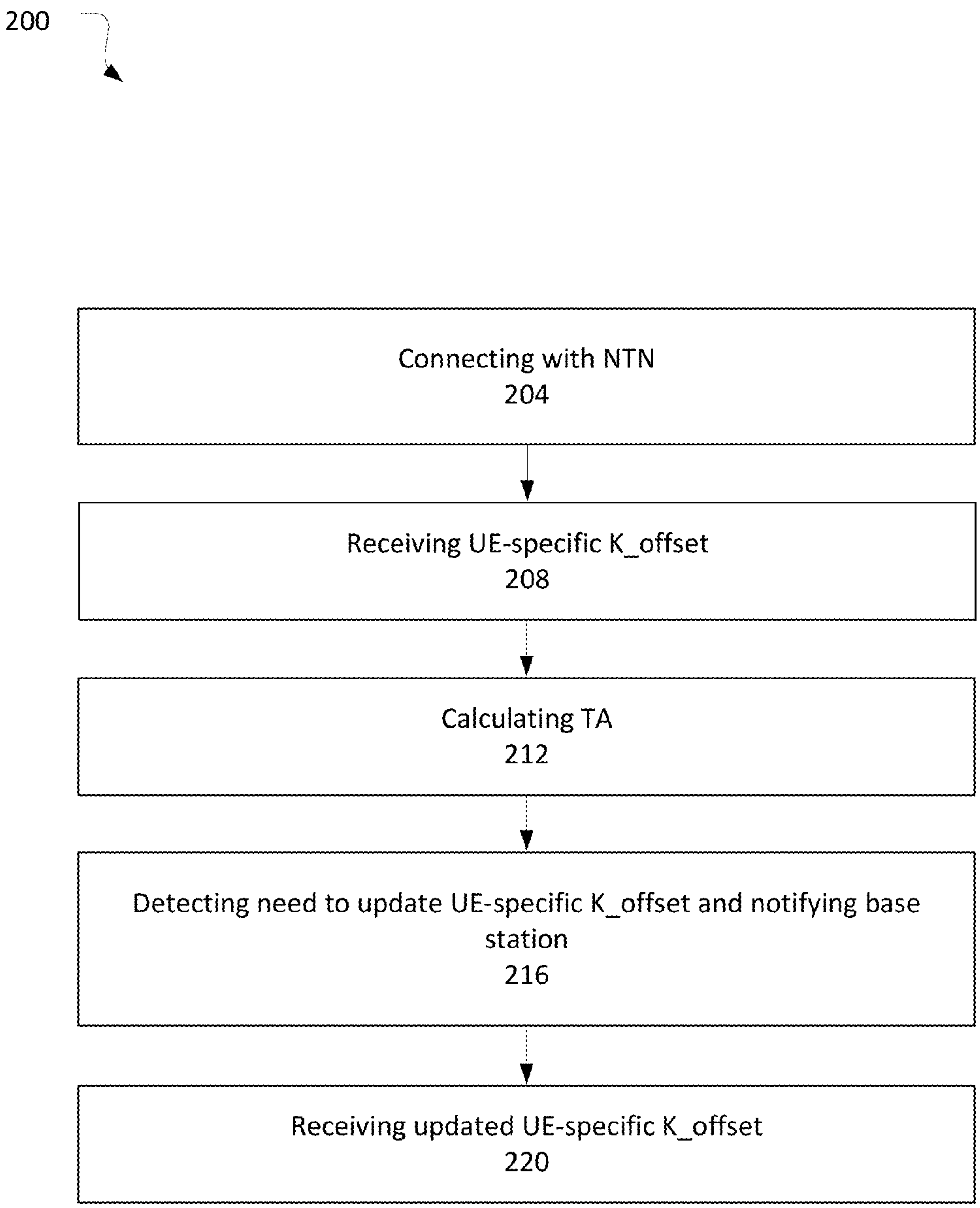
FIG. 2 illustrates an operational flow/algorithmic structure in accordance with some embodiments.

FIG. 2 illustrates an operational flow/algorithmic structure 200 in accordance with some embodiments. The operation flow/algorithmic structure 200 may be performed or implemented by a UE such as, for example, UE 106 or 600; or components thereof, for example, baseband processor 604A The operation flow/algorithmic structure 200 may include, at 204, connecting with an NTN. This may involve typical cell connection procedures.

The operation flow/algorithmic structure 200 may further include, at 208, receiving a UE-specific K_offset. The UE-specific K_offset may be received from a base station and control signaling.

The operation flow/algorithmic structure 200 may further include, at 212, calculating a TA. The TA ($T_{TA}$), which may be applied by the UE in RRC idle/inactive and RRC connected, may be defined as follows:

$$T_{TA}=(N_{TA}+N_{TA,UE\text{-}specific}+N_{TA,common}+N_{TA,offset})\times T_C. \quad \text{Equation 1}$$

$N_{TA}$ is defined as 0 for PRACH and updated based on a TA command field in msg2/msgB and MAC CE TA command. $N_{TA,\ UE\text{-}specific}$ is a self-estimated TA to pre-compensate for a service link delay between the UE 106 and the NTN device 108. $N_{TA,\ UE\text{-}specific}$ may be calculated by the UE 106 based on GNSS locations of the two devices. The base station 102 may broadcast satellite ephemeris information so that UE 106 can derive GNSS location. $N_{TA,\ common}$ is a network controlled common TA between the NTN device 108 and the timing reference point that is on the NTN device 108, base station 102 (or gateway) on the ground or anywhere on a feeder link between the NTN device 108 and the base station 102. $N_{TA,\ common}$ may include any timing offset considered necessary by the network. $N_{TA,\ offset}$ may be a fixed offset used to calculate the timing advance. $T_C$ is a basic time unit that is 0.5 nanoseconds.

The operation flow/algorithmic structure 200 may further include, at 216, detecting a need to update the UE-specific K_offset. This determination may be based on a difference between the UE-specific K_offset and a TA, or a difference between $TA_{new}$ and $TA_{old}$.

The operation flow/algorithmic structure 200 may further include, at 216, notifying the base station of the need to update the UE-specific K_offset. The notification may be a report that includes an indication to increase or decrease the UE-specific K_offset, or may include an indication of a differential TA value or an actual TA value.

The base station may be notified based on an event-triggered report or a periodic report.

The operation flow/algorithmic structure 200 may further include, at 220, receiving the updated UE-specific K_offset. The UE may then use the updated offset for determining transmit times.

Some embodiments have discussed the usage of the cell-specific K_offset in the context of updating K_offset after initial access. In some situations, the K_offset value signaled in system information may always be used for initial access procedure when UE is in RRC Idle state, e.g., RAR/fallbackRAR grant scheduled PUSCH, Msg3 retransmission scheduled by DCI format 0_0 with CRC scrambled by TC-RNTI, etc.

If the CRC of DCI format 1_0 is scrambled by C-RNTI, then there may be no ambiguity between gNB and UE on the updated value of K_offset. Hence, there may be no need to apply cell-specific K_offset when determining the transmission timing of HARQ-ACK on PUCCH to Msg4/MsgB scheduled by DCI format 1_0 with CRC scrambled by C-RNTI. Thus, if the UE 106 is provided with a K_offset value beyond system information, then that K_offset value may be used for the transmission timing of HARQ-ACK on PUCCH to Msg4/MsgB scheduled by DCI format 1_0 with CRC scrambled by C-RNTI.

Some embodiments may address the question of whether the cell-specific K_offset value is always to be used in determining the uplink transmission timing scheduled by fallback DCI formats. The main motivation of using only cell-specific K_offset value for fallback DCI is to avoid the ambiguity of K_offset, during the K_offset value update progress. This guarantees UE is always reachable. However, if we consider high layer signaling of K_offset update (e.g., MAC CE or RRC reconfiguration), the activation time is fixed and ambiguity does not exist. Hence, it may be desirable to apply the K_offset value not signaled in system information for the transmission timings related to fallback DCI formats, due to its efficiency. Thus, if a UE is provided with a K_offset value beyond system information, then that K_offset value may be used for the transmission timings scheduled by fallback DCI formats in accordance with some embodiments.

Some embodiments may additionally/alternatively include another offset for scheduling purposes. This offset may be referred to as a K_mac. If downlink and uplink frame timing is aligned at the base station 102, for UE action and assumption on uplink/downlink configuration indicated by a MAC CE command in the PDSCH, K_mac may not be needed. If downlink and uplink frame timing is not aligned at the base station 102, for UE action and assumption on downlink configuration indicated by a MAC CE command in the PDSCH, K_mac may be needed, and for UE action and assumption on uplink configuration indicated by a MAC CE command in the PDSCH, K_mac may not be needed.

The base station 102 may provide the UE 106 with an indication of the K_mac value. If the base station 102 does not provide the indication, the UE 106 may assume that the K_mac equals zero.

Various embodiments provide enhancements to K_mac signaling as follows.

The activation timing for downlink configuration from a MAC CE command may depend on the scheduling offset K_mac, which is different from K_offset. The K_mac value can be provided by the network. The MAC CE activation time may be based on K_mac, which may be assumed to have the unit of PUCCH slot.

K_mac may be used to estimate the UE-gNB RTT, which is set as the ra-ResponseWindow offset or msgB-ResponseWindow offset. This implies K_mac value needs to be known before UE's initial access. Hence, it is natural that K_mac is carried in system information.

On the other hand, the K_mac used to determine MAC CE activation time is in the unit of PUCCH slot. Note the numerology of PUCCH may be UE dependent. In other words, the K_mac carried in system information may not be aligned with numerology of UE dependent PUCCH. One way is the K_mac carried in system information is in absolute time (e.g., ms). Another way is the K_mac carried in system information is in the unit of a given subcarrier spacing in a given frequency range. For example, K_mac is in the unit of slots for the subcarrier spacing of 15 kHz if the carrier frequency is below 7.125 GHz and K_mac is in the unit of slots for the subcarrier spacing of 120 kHz if the carrier frequency is above 7.125 GHz.

In some embodiments, the scheduling offset K_mac is carried in system information, in the unit of milliseconds or in the unit of slots for a given subcarrier spacing in the frequency range.

K_mac may be used to determine the MAC CE activation time as follows. If the UE 106 is provided with a K_mac value, when the UE would transmit a PUCCH with HARQ-ACK information in uplink slot n corresponding to a PDSCH carrying a MAC CE command on a downlink configuration, the UE action and assumption on the downlink configuration shall be applied starting from the first slot that is after slot $$n + 3N_{slot}^{subframe,\mu} + K_{mac},$$

where μ is the SCS configuration for the PUCCH. It may be noted that K_mac is assumed to have the unit of the PUCCH slot; however, this may change in other embodiments.

K_mac may be used to determine the RAR window offset as follows. The start of a ra-ResponseWindow and msgB-ResponseWindow may be delayed by an estimate of a UE-gNB round trip time (RTT). The estimate of the UE-gNB RTT may be equal to a sum of the UE's TA and K_mac. In some instances, the UE may not assume that the UE-gNB RTT is equal to the calculated TA for Msg1/MsgA.

The K_mac may be transmitted in system information. However, K_mac carried in system information may not be aligned with a numerology of a UE-dependent PUCCH. Thus, signaling options may be provided.

In a first signaling option, the K_mac carried in system information may be in units of absolute time (for example, milliseconds).

In a second signaling option, the K_mac carried in system information may be in the unit of a fixed subcarrier spacing in a given frequency range. For example, K_mac may be in the unit of slots for the SCS of 15 kHz in frequency range 1 (FR1) and K_mac is in the units of slots for the SCS of 120 kHz in frequency range 2 (FR2).

With either the first or the second signaling option, the UE 106 may cover the K_mac received in system information into the proper slot numbers according to SCS of its PUCCH.

An RAR window offset defines a delay for a start of ra-ResponseWindow and msgB-ResponseWindow. The RAR window for both 2-step RACH and 4-step RACH may be equal to an estimate of the UE-gNB RTT, which may be a sum of K_mac and the UE's TA (as given by Equation 1, for example). The estimate of the gNB-satellite RTT may be equal to the sum of $N_{TA,common} \times T_c$ and K_mac.

In some situations, when the UE 106 is not provided a K_mac value by the network, the UE may assume the K_mac equals zero.

In some embodiments, $N_{TA}$ may be set to zero in estimating the UE-gNB RTT, which may be aligned with PRACH transmissions. Since there is no TA command available when the UE estimates the RAR window offset, it may be natural to assume $N_{TA}$ as zero.

In some embodiments, the value of $N_{TA,offset}$ may be broadcast (for example in a serving cell configuration common (servingCellConfigCommon) IE) or could be a default value (as defined in a TS, for example) for a given frequency range.

The TA applied by an NR NTN UE in either RRC_IDLE/INACTIVE state or RRC_CONNECTED state may depend on UE self-estimated TA ($N_{TA,UE\text{-}specific}$) for service link and common TA ($N_{TA,common}$) indicated by the network.

Some embodiments described whether common TA drift rate and common TA drift variation rate are to be broadcasted from the network. The common TA drift rate and common TA drift variation rate may be used to determine the common TA used both in initial access and after initial access.

The actual common TA value may drift a large amount if the time gap between two neighbor common TA broadcasts is large. Consider an example of a common TA drift rate of 20 μs/s and the time gap between two common TA broadcasts is 160 ms. Then the actual common TA is shifted 3.2 μs, which is larger than CP length for SCS=30 kHz.

In a first option, the common TA drift rate and/or common TA drift variation rate are broadcasted so that UE adjusts its common TA based on these drift parameters. This option provides a better approximation of UE's applied common TA to the actual common TA at the cost of signaling overhead.

In a second option, neither common TA drift rate nor common TA drift variation rate is broadcasted. The common TA used by UE does not update between two neighbor common TA receptions. In this option, the common TA used by UE may not match the actual common TA value. This requires the network to keep adjusting its DL-UL timing gap. In this option, the feeder link timing drift is transparent to UE.

The challenge to the first option is that UE's uplink timing error already includes DL synchronization error, clock drift/jitter, UE's GNSS error, satellite position projection error, etc. If the feeder link timing error is additionally counted in UE's total uplink timing error, then UE implementation complexity is increased, since the other timing errors need to be compressed to reach the overall uplink timing error budget. The challenge to the second option is that a large and time-varying time misalignment between uplink and downlink at gNB significantly leads to gNB implementation complexity.

Whether or not common TA drift parameters are indicated can be based on network implementation. For example, if the timing reference point is at the satellite, then there is no need for the network to broadcast common TA drift parameters. If the timing reference point is at gNB and it is thought to be beneficial if UE pre-compensates the feeder link drift, then the common TA drift parameters could be broadcasted by the network.

When not receiving the common TA drift parameters, UE does not adjust its common TA between two neighbor common TA receptions. When receiving the common TA drift parameters, UE needs to pre-compensate the drifted common TA in its uplink transmissions. However, the common TA timing error (i.e., the gap between UE's applied common TA and the actual common TA) should not be counted in UE's overall uplink timing error budget.

Thus, embodiments describe that network implementation determines the indication of common TA drift parameters. If common TA drift parameters are not indicated, then UE assumes no common TA drift. If common TA drift parameters are indicated, then UE pre-compensates the drifted common TA. The common TA timing error is not counted in UE's uplink timing error budget. Common TA drift parameters include at least the common TA drift rate. FFS common TA drift high order derivatives.

Some embodiments describe signaling enhancements to the ephemeris of the NTN devices that may be broadcast to facilitate the signal timing enhancements. Ephemeris may be delivered in a plurality of formats including, for example, satellite position and velocity state vectors (hereinafter "state vector format") and orbital parameter format. The specifications may support delivery of ephemeris using both of these formats.

The state vector format may include a first set of information including position information provided as X, Y, Z values (in meters (m), for example) in the Earth centered, Earth fixed (ECEF) coordinate system; and velocity information provided as velocity in X direction (VX), velocity in Y direction (VY), and velocity in Z direction (VZ) (in meters per second (m/s), for example) in the ECEF coordinate system.

The orbital parameter format may include a second set of information including one or more of the following parameters: a semi-major axis ($\alpha$) in meters; eccentricity (e); argument of periapsis ($\omega$) in radians; inclination (i) in radians; longitude of ascending node ($\Omega$) in radians; and mean anomaly ($M_0$) at epoch time ($t_0$) in radians.

In some embodiments, pre-provisioned ephemeris based on orbital elements may be used as a reference, with only delta corrections being broadcast in order to reduce overhead.

The orbital propagator model may be defined at the UE 106.

Some embodiments describe efficient provision of the serving satellite ephemeris by basing the information on the satellite types.

For the state vector format, different ranges and resolutions on (X, Y, Z) and (VX, VY, VZ) may be applied to different types of satellites. The types of satellites may be based on the satellite's altitude range. For example, a first type may correspond to GEO, a second type may correspond to MEO, a third type may correspond to LEO, and a fourth type may correspond to HAPS. Each of these types may be associated with respective ranges/resolutions. In some embodiments, additional spare values may be provided to enable future adaptations.

In some embodiments, the broadcast information may include one or more bits that indicate the satellite type. For example, some embodiments may include two explicit/implicit bits to indicate the satellite type. Additionally/alternatively, the satellite types may be implicitly indicated based on the signaling range/resolution values that are provided in the broadcast message. Different scaling factors may be used for different groups/types for signaling the range and resolution values. Additional spare values may be used to enable future adaptations.

In broadcasting the position information (X, Y, Z) of the state vector format, the ranges and resolution of each value may depend on the satellite type.

For example, ranges of each X, Y, Z value may be reduced for some satellite types as compared to other satellite types.

Resolution of X, Y, Z could be different depending on the satellite types in accordance with one of the following options.

In a first option, ephemeris may be transmitted with different payload sizes for different satellite types. The resolution of X, Y, Z could be larger for GEO-type satellites since the time/frequency air may be relatively small due to the more static location of the satellite. The resolution of X, Y, Z could be smaller for LEO-type satellites since the time/frequency error may be relatively large due to fast satellite movement.

In a second option, ephemeris may be transmitted with the same payload sizes for different satellite types. The resolution of X, Y, Z could be smaller for GEO-type satellites since more bits could be saved from VX, VY, and VZ field of the satellite ephemeris due to slow satellite movement. The resolution of X, Y, Z could be larger for LEO-type satellites since more bits will be allocated to VX, VY, VZ fields of the satellite ephemeris due to fast satellite movement.

In broadcasting the velocity information (VX, VY, VZ) of the state vector format, the ranges and resolution of each value may depend on the satellite type.

For example, ranges of each VX, VY, VZ value may be reduced for some satellite types as compared to other satellite types. A range may be set at [0, X] for GEO-type satellites, where X is small; range may be [Y, Z], where Y, Z>X.

Resolution of VX, VY, VZ could be different depending on the satellite types in accordance with one of the following options.

In a first option, ephemeris may be transmitted with different payload sizes for different satellite types. The resolution of VX, VY, VZ could be smaller for GEO-type satellites and could be larger for LEO-type satellites.

In a second option, ephemeris may be transmitted with the same payload sizes for different satellite types. The resolution of VX, VY, VZ could be larger for GEO-type satellites and could be smaller for LEO-type satellites.

In some embodiments, the velocity value range for LEO could be large, while its position value range could be small (due to its relatively low altitude); and the velocity value range for GEO could be small, while its position value range could be large (due to its relatively high altitude). For example, assume the ephemeris payload size for LEO is X1 bits for velocity, and X2 bits for position and assume the ephemeris payload size for GEO is Y1 bits for velocity, and Y2 bits for position. Overall, X1>Y1 and X2<Y2. But X1+X2=Y1+Y2. If a satellite has smaller position values, then it may have larger velocity values.

In some embodiments, establishing TA parameters may also be dependent on the satellite types. In particular, the common TA and a common TA drift rate (including higher order derivative) may depend on satellite types.

The value range of the common TA may be large for a GEO-type satellite and small for a LEO-type satellite.

The value range of the common TA drift rate may be small for a GEO-type satellite and large for a LEO-type satellite.

In some embodiments, broadcasting the TA parameters may be based on one of the following options.

In a first option, the same payload size on common TA and on common TA drift for different satellite types may be used. For the common TA, a value range that covers both GEO-type and LEO-type satellites may be used. Similarly, for the common TA drift rate, the value range that covers both GEO-type and LEO-type satellites may be used.

In a second option, the same payload size (with different resolutions) on common TA and on common TA drift rate for different satellite types may be used. For the common TA, the GEO-type satellites may have a large value range with low resolution and the LEO-type satellites may have a small value range with high resolution. For the common TA drift rate, the GEO-type satellites may have a small value range with high resolution and the LEO-type satellites may have a large value range with low resolution.

In a third option, different payload size on common TA and on common TA drift rate for different satellite types may be used. For the GEO-type satellites, more payload may be allocated to the common TA, while less payload may be allocated to the common TA drift rate. For the LEO-type satellites, more payload may be allocated to the common TA drift rate while less payload may be allocated to the common TA.

Some embodiments describe how to maintain both open loop and closed loop TA.

When the UE 106 receives the new serving satellite ephemeris, it may need to adjust its TA. If the UE 106 does not receive any TA command between the two satellite ephemeris readings, the TA adjustment (Δt) may be defined as follows:

$$\Delta t = \frac{D_2(t) - D_1(t)}{c},$$

where $D_2(t)$ is a distance between the UE 106 and the satellite (e.g., NTN device 108) based on the new ephemeris information at the uplink transmission time t, $D_1(t)$ is a distance between the UE 106 and the satellite (e.g., NTN device 108) based on the old ephemeris information at the uplink transmission time t, and c is the speed of light.

If the UE 106 receives one or more TA commands between the two satellite ephemeris readings, the TA adjustment (Δt) may be defined as follows:

$$\Delta t = \frac{D_2(t) - D_1(t)}{c} - \Sigma_i \Delta t_i,$$

where $\Sigma_i \Delta t_i$ is a summation of all TA commands received between the two satellite ephemeris readings.

A similar approach may be applied for the UE's GNSS reception.

Figure 3:
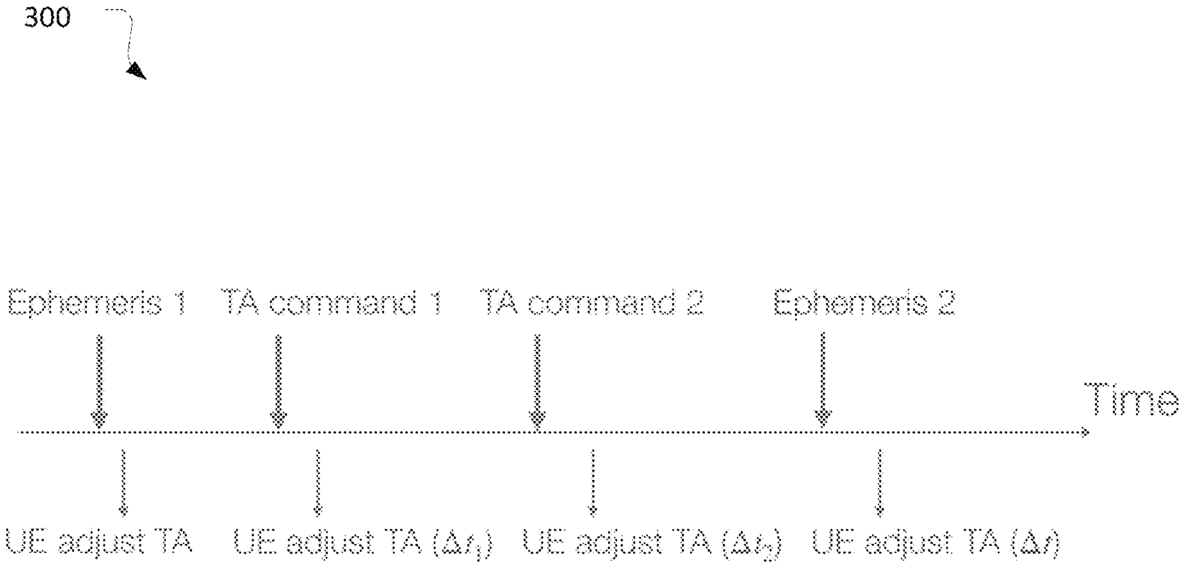
FIG. 3 illustrates a signaling diagram in accordance with some embodiments.

FIG. 3 illustrates a sequence diagram 300 to describe joint close loop and open loop TA maintenance in accordance with some embodiments. The diagram illustrates a first ephemeris reading (ephemeris 1) and a second ephemeris reading (ephemeris 2). Between the two ephemeris readings, the UE 106 may receive two TA commands, TA command 1 and TA command 2.

After ephemeris 1, the UE 106 may adjust its TA on its own, for example, in an open loop manner. In some situations, the network may determine the TA is not accurate and may send TA commands 1 and 2. The UE 106 may then update the TA based on the network commands, for example, in a close loop manner. Upon receiving ephemeris 2, it may not be desirable for the UE 106 to simply rely on ephemeris 2 to determine the TA in an open loop manner as it would then discard the effect of the network commands. Thus, the TA adjustment (Δt) may be determined as noted above.

Some embodiments describe how to deal with the UE without a new type 2 HARQ-ACK codebook construction scheme. In some situations, enabling/disabling of HARQ feedback for downlink transmission may be configurable for a HARQ process via UE-specific RRC signaling. The disabling of HARQ feedback for downlink transmission may be based on a UE capability. For UE without the capability of supporting disabling on HARQ feedback, there may be no configuration of disabling HARQ feedback. The UE capability may further indicate the maximum number of HARQ processes with feedback disabled.

The activation/deactivation of disabling HARQ feedback may be done by MAC CE.

Figure 4:
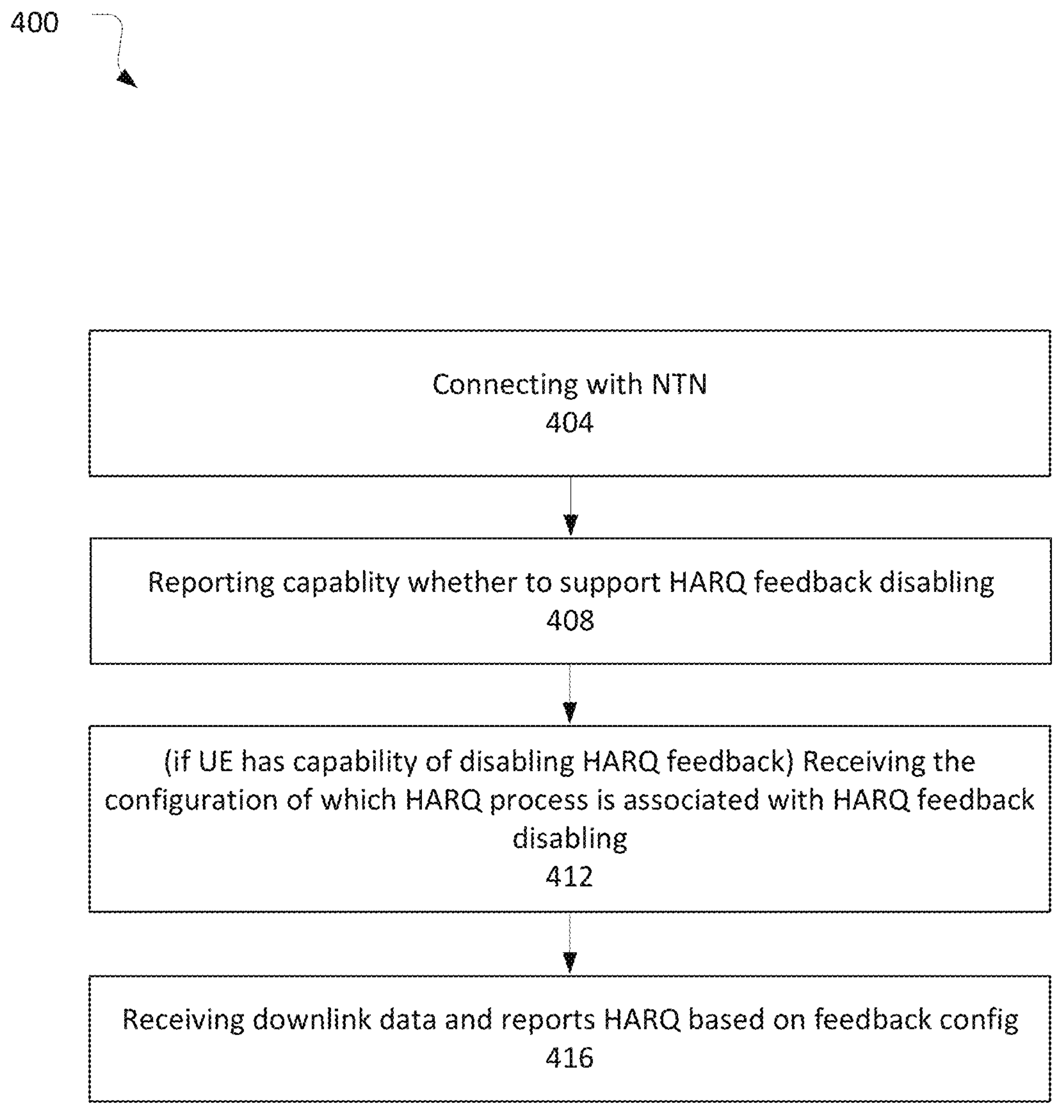
FIG. 4 illustrates another operational flow/algorithmic structure in accordance with some embodiments.

FIG. 4 illustrates an operational flow/algorithmic structure 400 in accordance with some embodiments. The operation flow/algorithmic structure 400 may be performed or implemented by a UE such as, for example, UE 106 or 600; or components thereof, for example, baseband processor 604A The operation flow/algorithmic structure 400 may include, at 404, connecting with an NTN.

The operation flow/algorithmic structure 400 may further include, at 408, reporting capability of the UE to support HARQ feedback disabling.

If the UE does not have the capability to support HARQ feedback disabling, there may be no configuration of disabling HARQ feedback.

If the UE does have the capability to support HARQ feedback disabling, the operation flow/algorithmic structure 400 may further include, at 412, receiving the configuration of which HARQ process is associated with HARQ feedback disabling.

The operation flow/algorithmic structure 400 may further include, at 416, receiving downlink data and reporting the HARQ based on the feedback configuration.

Some embodiments describe how to ensure the UE 106 properly receives the ephemeris information. For example, embodiments describe when the UE 106 detects a trigger to read ephemeris.

In some embodiments, triggering of ephemeris reading may be based on a validity timer that is set for the ephemeris information.

In some embodiments, triggering of ephemeris may be based on a number of TA commands received by the UE 106. For example, if an RRC-connected mode UE receives a certain number of TA commands within a certain duration T, then it may be likely that the ephemeris is outdated. Thus, in some embodiments, ephemeris reading may be triggered if a number of TA commands received in T is larger than a threshold Thres. The duration T and the threshold Thres may be configured and indicated in an RRC configuration message or SIB. The values of T and Thres may depend on the type of satellite, for example, GEO, LEO, etc.

In some embodiments, an ephemeris reading may be triggered if a total number of TA adjustments within a certain period T is larger than a threshold. For example, if the value of $\Sigma_i \Delta t_i$, which is a summation of all TA commands received during duration T, is greater than a predetermined threshold, the ephemeris reading may be triggered.

Figure 5:
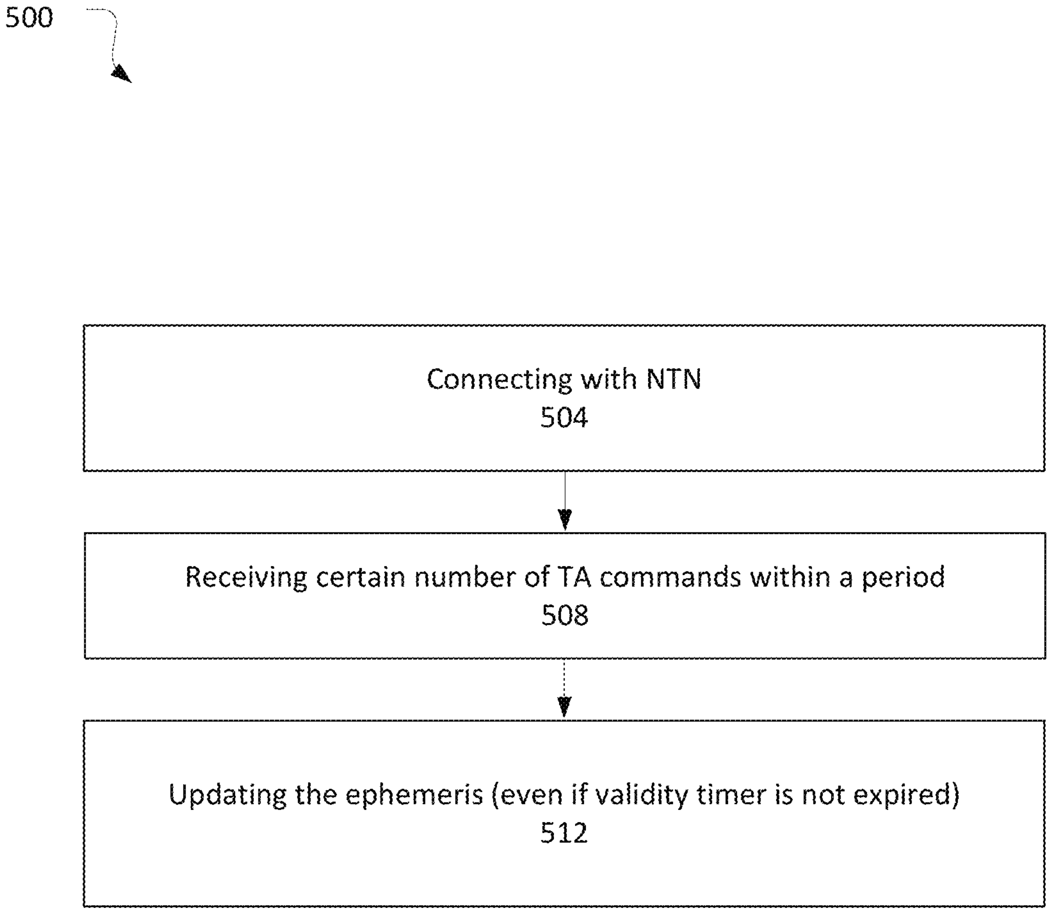
FIG. 5 illustrates another operational flow/algorithmic structure in accordance with some embodiments.

FIG. 5 illustrates an operational flow/algorithmic structure 500 in accordance with some embodiments. The operation flow/algorithmic structure 500 may be performed or implemented by a UE such as, for example, UE 106 or 600; or components thereof, for example, baseband processor 604A The operation flow/algorithmic structure 500 may include, at 504, connecting with an NTN.

The operation flow/algorithmic structure 500 may further include, at 508, receiving a certain number of TA commands (or receiving an accumulated TA adjustment greater than a threshold) within a period of time.

The operation flow/algorithmic structure 500 may further include, at 512, updating the ephemeris. The ephemeris may be updated even if the validity timer associated with the ephemeris is not yet expired.

Figure 6:
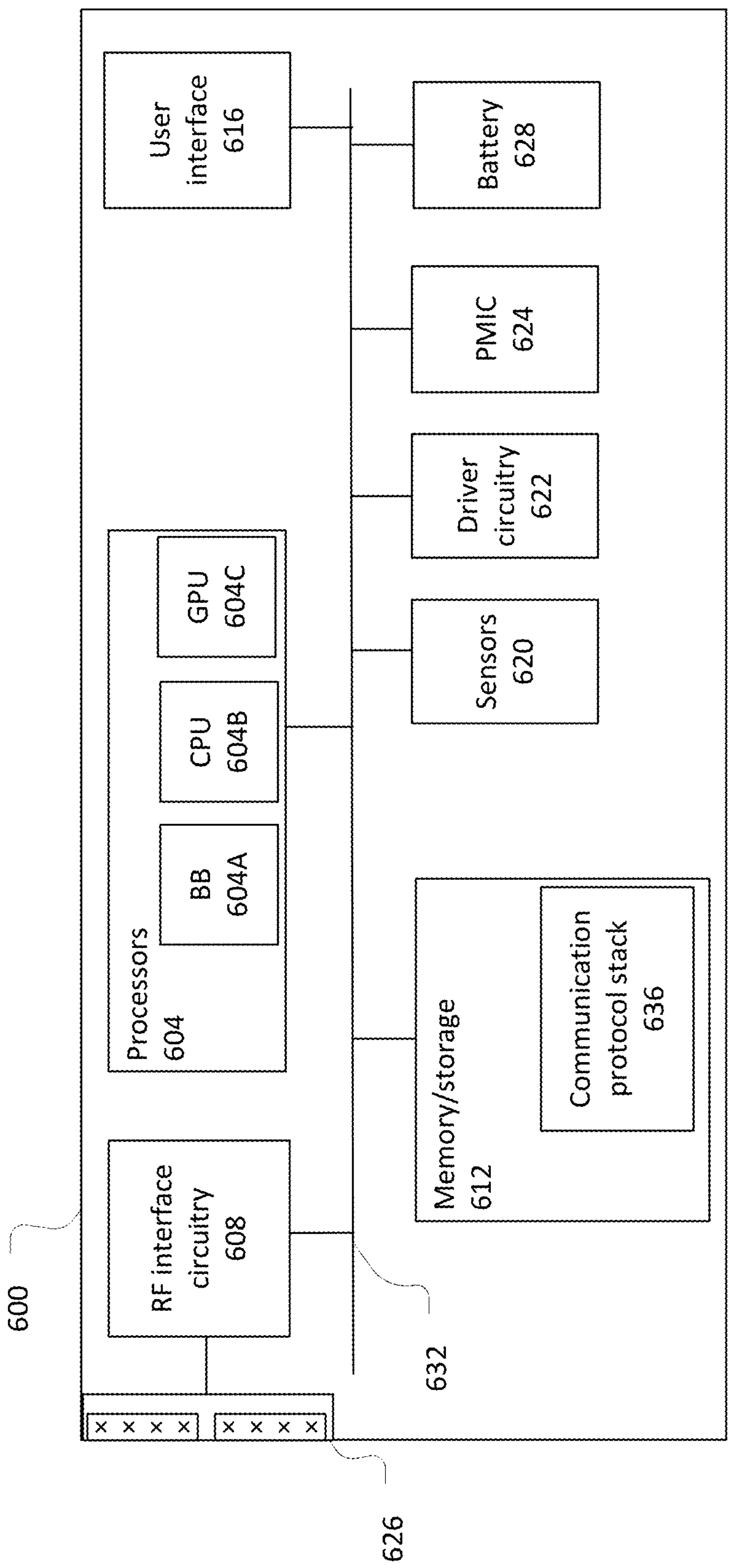
FIG. 6 illustrates a user equipment in accordance with some embodiments.

FIG. 6 illustrates a UE 600 in accordance with some embodiments. The UE 600 may be similar to and substantially interchangeable with UE 106 of FIG. 1.

The UE 600 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 600 may include processors 604, RF interface circuitry 608, memory/storage 612, user interface 616, sensors 620, driver circuitry 622, power management integrated circuit (PMIC) 624, antenna 626, and battery 628. The components of the UE 600 may be implemented as integrated circuits (ICs), portions thereof, discrete electronic devices, or other modules, logic, hardware, software, firmware, or a combination thereof. The block diagram of FIG. 6 is intended to show a high-level view of some of the components of the UE 600. However, some of the components shown may be omitted, additional components may be present, and different arrangement of the components shown may occur in other implementations.

The components of the UE 600 may be coupled with various other components over one or more interconnects 632, which may represent any type of interface, input/output, bus (local, system, or expansion), transmission line, trace, or optical connection that allows various circuit components (on common or different chips or chipsets) to interact with one another.

The processors 604 may include processor circuitry such as, for example, baseband processor circuitry (BB) 604A, central processor unit circuitry (CPU) 604B, and graphics processor unit circuitry (GPU) 604C. The processors 604 may include any type of circuitry or processor circuitry that executes or otherwise operates computer-executable instructions, such as program code, software modules, or functional processes from memory/storage 612 to cause the UE 600 to perform operations as described herein.

In some embodiments, the baseband processor circuitry 604A may access a communication protocol stack 636 in the memory/storage 612 to communicate over a 3GPP compatible network. In general, the baseband processor circuitry 604A may access the communication protocol stack 636 to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 608.

The baseband processor circuitry 604A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The memory/storage 612 may include one or more non-transitory, computer-readable media that includes instructions (for example, communication protocol stack 636) that may be executed by one or more of the processors 604 to cause the UE 600 to perform various operations described herein. The memory/storage 612 includes any type of volatile or non-volatile memory that may be distributed throughout the UE 600. In some embodiments, some of the memory/storage 612 may be located on the processors 604 themselves (for example, L1 and L2 cache), while other memory/storage 612 is external to the processors 604 but accessible thereto via a memory interface. The memory/storage 612 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 608 may include transceiver circuitry and a radio frequency front module (RFEM) that allows the UE 600 to communicate with other devices over a radio access network. The RF interface circuitry 608 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna 626 and proceed to filter and amplify (with a low-noise amplifier) the signal. The signal may be provided to a receiver of the transceiver that down-converts the RF signal into a baseband signal that is provided to the baseband processor of the processors 604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 626.

In various embodiments, the RF interface circuitry 608 may be configured to transmit/receive signals in a manner compatible with NR access technologies.

The antenna 626 may include antenna elements to convert electrical signals into radio waves to travel through the air and to convert received radio waves into electrical signals. The antenna elements may be arranged into one or more antenna panels. The antenna 626 may have antenna panels that are omnidirectional, directional, or a combination thereof to enable beamforming and multiple input, multiple output communications. The antenna 626 may include microstrip antennas, printed antennas fabricated on the surface of one or more printed circuit boards, patch antennas, or phased array antennas. The antenna 626 may have one or more panels designed for specific frequency bands including bands in FR1 or FR2.

The user interface circuitry 616 includes various input/output (I/O) devices designed to enable user interaction with the UE 600. The user interface 616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 600.

The sensors 620 may include devices, modules, or subsystems whose purpose is to detect events or changes in their environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 622 may include software and hardware elements that operate to control particular devices that are embedded in the UE 600, attached to the UE 600, or otherwise communicatively coupled with the UE 600. The driver circuitry 622 may include individual drivers allowing other components to interact with or control various input/output (I/O) devices that may be present within, or connected to, the UE 600. For example, driver circuitry 622 may include a display driver to control and allow access to a display device, a touchscreen driver to control and allow access to a touchscreen interface, sensor drivers to obtain sensor readings of sensor circuitry 620 and control and allow access to sensor circuitry 620, drivers to obtain actuator positions of electro-mechanic components or control and allow access to the electro-mechanic components, a camera driver to control and allow access to an embedded image capture device, audio drivers to control and allow access to one or more audio devices.

The PMIC 624 may manage power provided to various components of the UE 600. In particular, with respect to the processors 604, the PMIC 624 may control power-source selection, voltage scaling, battery charging, or DC-to-DC conversion.

In some embodiments, the PMIC 624 may control, or otherwise be part of, various power-saving mechanisms of the UE 600 including DRX as discussed herein.

A battery 628 may power the UE 600, although in some examples the UE 600 may be mounted deployed in a fixed location, and may have a power supply coupled to an electrical grid. The battery 628 may be a lithium ion battery, a metal-air battery, such as a zinc-air battery, an aluminum-air battery, a lithium-air battery, and the like. In some implementations, such as in vehicle-based applications, the battery 628 may be a typical lead-acid automotive battery.

Figure 7:
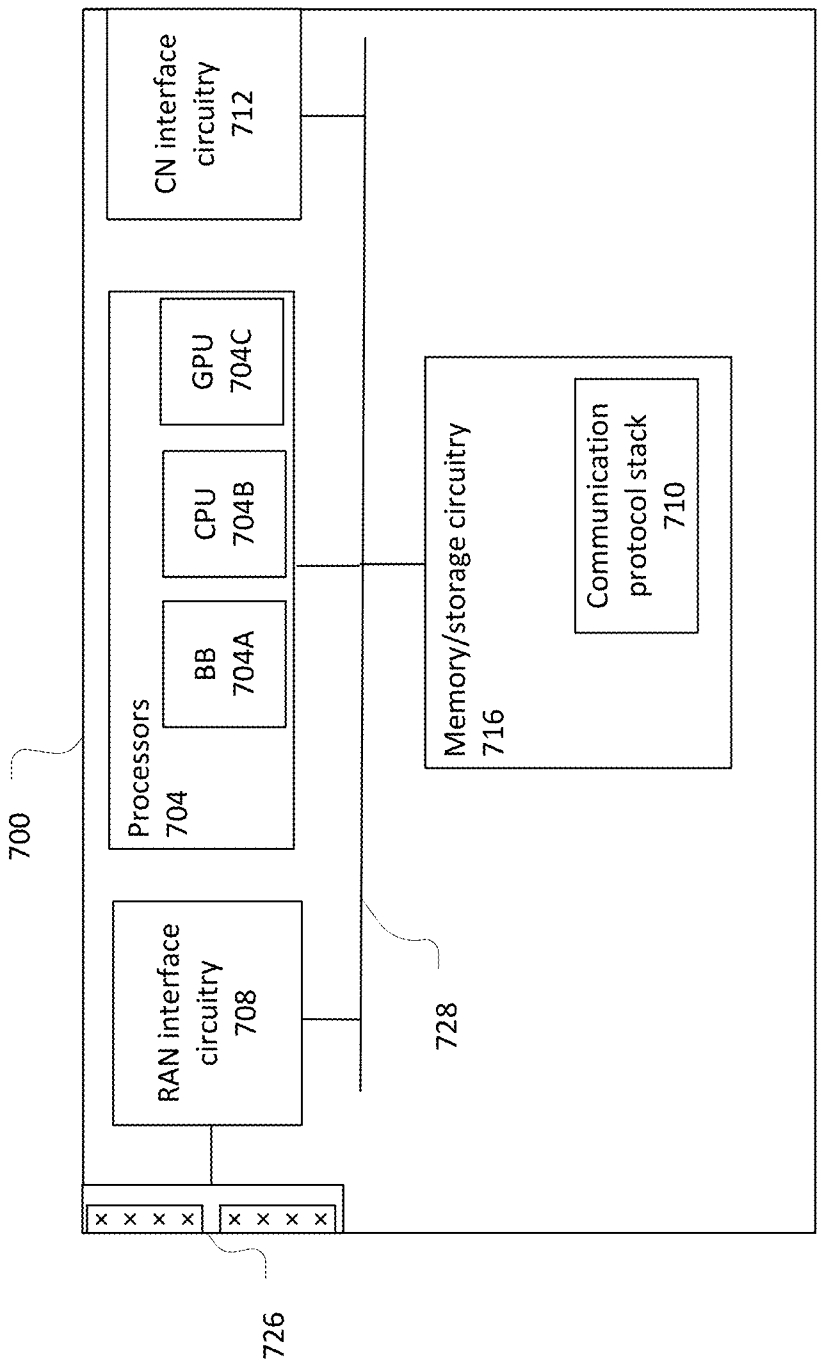
FIG. 7 illustrates a network device in accordance with some embodiments.

FIG. 7 illustrates a network device 700 in accordance with some embodiments. The network device 700 may be similar to and substantially interchangeable with base station 102 of FIG. 1.

The network device 700 may include processors 704, RF interface circuitry 708 (if implemented as a base station), core network (CN) interface circuitry 712, memory/storage circuitry 716, and antenna structure 726 (if implemented as a base station).

The components of the network device 700 may be coupled with various other components over one or more interconnects 728.

The processors 704, RF interface circuitry 708, memory/storage circuitry 716 (including communication protocol stack 710), antenna structure 726, and interconnects 728 may be similar to like-named elements shown and described with respect to FIG. 7. If the device 700 is implemented as a base station, the communication protocol stack 710 may include access stratum layers. If the network device 700 is implemented as an AMF 120 or PCF 122, the communication protocol stack 710 may include a NAS layer.

The CN interface circuitry 712 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 700 via a fiber optic or wireless backhaul. The CN interface circuitry 712 may include one or more dedicated processors or FPGAs to communicate using one or more of the aforementioned protocols. In some implementations, the CN interface circuitry 712 may include multiple controllers to provide connectivity to other networks using the same or different protocols.

In some embodiments, the base station 700 may be coupled with transmit receive points (TRPs) using the antenna structure 726, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

Examples

In the following sections, further exemplary embodiments are provided.

Example 1 includes a method comprising: receiving a user equipment (UE)-specific offset value; calculating a timing advance (TA); determining, based on the TA, whether updates are needed for the UE-specific offset value; and transmitting a report to a base station based on said determining whether updates are needed for the UE-specific offset value.

Example 2 includes the method of example 1 or some other example herein, wherein determining whether updates are needed comprises: comparing a difference between the UE-specific offset value and the TA to one or more predetermined thresholds.

Example 3 includes the method of example 2 or some other example herein, further comprising: detecting a condition based on the difference being greater or equal to a first predetermined threshold of the one or more predetermined thresholds and less than or equal to a second predetermined threshold of the one or more predetermined thresholds; and determining no updates are needed for the UE-specific offset value based on said detecting the condition.

Example 4 includes the method of example 2 or some other example herein, further comprising: detecting a condition based on the difference being greater than a first predetermined threshold of the one or more predetermined thresholds; determining an update is needed for the UE-specific offset value, wherein the report includes a request to decrease the UE-specific offset value by an increment, by an indicated value, or to an indicated value.

Example 5 includes the method of example 2 or some other example herein, further comprising: detecting a condition based on the difference being less than a first predetermined threshold of the one or more predetermined thresholds; determining an update is needed for the UE-specific offset value, wherein the report includes a request to increase the UE-specific offset value by an increment, by an indicated value, or to an indicated value.

Example 6 includes the method of any one of examples 2-5 or some other example herein, wherein the one or more predetermined thresholds are based on a subcarrier spacing, are signaled in a radio resource control (RRC) configuration, or are signaled in a system information block (SIB).

Example 7 includes the method of example 1 or some other example herein, wherein the TA is a first number of slots and the UE-specific offset value is a second number of slots; or the TA is a first number of milliseconds and the UE-specific offset value is a second number of milliseconds.

Example 8 includes the method of example 1 or some other example herein, further comprising: receiving an update to the UE-specific offset value.

Example 9 includes the method of example 1 or some other example herein, wherein the TA is a first TA calculated upon receiving the UE-specific K_offset and the method further comprises: calculating a second TA with a slot after calculating the first TA; comparing a difference between the second TA and the first TA; and determining whether updates are needed based on the difference, wherein the first TA is a first number of slots and the second TA is a second number of slots.

Example 10 includes the method of example 9 or some other example herein, further comprising: detecting a condition based on an absolute value of the difference being less than or equal to a predetermined threshold; and determining no updates are needed for the UE-specific offset value based on said detecting the condition.

Example 11 includes the method of example 9 or some other example herein, further comprising: detecting a condition based on an absolute value of the difference being greater than a predetermined threshold; and determining an update is needed for the UE-specific offset value based on said detecting the condition, wherein the report is to include a request to increase or decrease the UE-specific offset value by an increment, by an indicated value, or to an indicated value.

Example 12 includes the method of example 9 or some other example herein, further comprising: detecting a condition based on an absolute value of the difference being greater than a predetermined threshold; and determining an update is needed for the UE-specific offset value based on said detecting the condition, wherein the report is to include an indication of the second TA or the difference.

Example 12.1 includes the method of example 12 or some other example herein, wherein the indication is at a granularity of one or more slots.

Example 13 includes the method of example 2 or 9 or some other example herein, further comprising: detecting a report trigger based on the difference; and transmitting the report based on detecting the report trigger.

Example 14 includes a method comprising: receiving an indication in a system information message; determining a scheduling offset value based on the indication and a numerology of a physical uplink control channel (PUCCH); and determining a media access control (MAC) control element (CE) activation time or a random access response (RAR) window offset based on the scheduling offset value.

Example 15 includes the method of example 14 or some other example herein, wherein the indication is a number of slots for a reference numerology or is a number of milliseconds.

Example 16 includes a method of operating a user equipment (UE), the method comprising: determining, based on a broadcast transmission or a default value for a frequency range, a fixed offset; determining a timing advance based on the fixed offset; estimating a UE-gNB round trip time (RTT) based on the timing advance; and starting a random access (RA) or message B (msgB) response window based on estimating the UE-gNB RTT.

Example 17 includes the method of example 16 or some other example herein, wherein the timing advance is TTA and determining the timing advance is based on: $T_{TA}=(N_{TA}+N_{TA,UE\text{-}specific}+N_{TA,common}+N_{TA,offset})\times T_C$, where $N_{TA}$ is zero, $N_{TA,offset}$ is the fixed offset, $N_{TA,UE\text{-}specific}$ is a UE-specific TA calculated by the UE, $N_{TA,common}$ is a common offset, and $T_C$ is a basic time unit that is 0.5 nanoseconds.

Example 18 includes a method comprising: generating a message to include ephemeris related to a non-terrestrial device (NTD) in a non-terrestrial network (NTN), the ephemeris having a range and resolution based on a type of the NTD; and broadcasting the message in the NTN.

Example 19 includes the method of example 18 or some other example herein, wherein the ephemeris includes position and velocity state vectors.

Example 20 includes the method of example 18 or some other example herein, wherein the type is a geosynchronous Earth orbit (GEO) type, a medium Earth orbit (MEO) type, a low Earth orbit (LEO), or a high-altitude platform station (HAPS) type.

Example 21 includes the method of example 18 or some other example herein, wherein the message includes an indication of the type.

Example 22 includes the method of example 18 or some other example herein, wherein the type is implicitly indicated based on signaling range or resolution values.

Example 23 includes the method of example 18 or some other example herein, wherein the NTD is a first NTD of a first type and the method further comprises: generating the message or another message to include ephemeris of a second NTD of a second type, wherein the message or the other message includes a first payload size for ephemeris of the first NTD and a second payload size for ephemeris of the second NTD, wherein the first payload size is the same as or different from the second payload size.

Example 24 includes the method of example 23 or some other example herein, wherein the first type is a geosynchronous Earth orbit (GEO) type, the second type is an orbit type lower than the GEO type, and resolution of the ephemeris of the first NTD is greater than a resolution of the ephemeris of the second NTD.

Example 25 includes the method of example 23 or some other example herein, wherein the first type is a geosynchronous Earth orbit (GEO) type, the second type is an orbit type lower than the GEO type, the first payload size is the same as the second payload size, and: the ephemeris of the first NTD has a position resolution smaller than a position resolution of the ephemeris of the second NTD; or the ephemeris of the first NTD has a velocity resolution larger than a velocity resolution of the ephemeris of the second NTD.

Example 26 includes the method of example 23 or some other example herein, wherein the first type is a geosynchronous Earth orbit (GEO) type, the second type is an orbit type lower than the GEO type, the first payload size is different from the second payload size, and: the ephemeris of the first NTD has a position resolution larger than a position resolution of the ephemeris of the second NTD; or the ephemeris of the first NTD has a velocity resolution smaller than a velocity resolution of the ephemeris of the second NTD.

Example 27 includes the method of example 18 or some other example herein, further comprising: generating the message to include a common timing advance (TA) or a common TA drift rate based on the type.

Example 28 includes a method comprising: determining whether a timing advance (TA) command was received between receipt of a first ephemeris and receipt of a second ephemeris; and adjusting a timing advance (TA) based on the second ephemeris based on whether the TA command was received between receipt of the first ephemeris and receipt of a second ephemeris.

Example 29 includes the method of example 28 or some other example herein, further comprising: detecting a condition based on determining a TA command was not received between receipt of the first ephemeris and receipt of the second ephemeris; adjusting, based on detecting the condition, the TA by an adjustment amount (Δt) based on:

$$\Delta t = \frac{D_2(t) - D_1(t)}{c},$$

where $D_2(t)$ is a distance between UE and NTD based on the second ephemeris at an uplink transmission time (t), $D_1(t)$ is a distance between UE and NTD based on the first ephemeris at the uplink transmission time (t), and c is a speed of light.

Example 30 includes the method of example 28 or some other example herein, further comprising: detecting a condition based on determining one or more TA commands were received between receipt of the first ephemeris and receipt of the second ephemeris; adjusting, based on detecting the condition, the TA by an adjustment amount (Δt) determined by:

$$\Delta t = \frac{D_2(t) - D_1(t)}{c} - \Sigma\Delta t_i,$$

where $D_2(t)$ is a distance between UE and NTD based on the second ephemeris at an uplink transmission time (t), $D_1(t)$ is a distance between UE and NTD based on the first ephemeris at the uplink transmission time (t), c is a speed of light, and $\Sigma\Delta t_i$ sums the one or more TA commands received between the first and second ephemeris.

Example 31 includes a method of operating a user equipment (UE), the method comprising: generating a message to include an indication of whether the UE supports hybrid automatic repeat request (HARQ) feedback disabling; and transmitting the message to a base station.

Example 32 includes the method of example 31 or some other example herein, wherein the indication is to indicate that the UE supports HARQ feedback disabling and the method further comprises: receiving a configuration that identifies one or more HARQ processes that are associated with HARQ feedback disabling.

Example 33 includes the method of example 32 or some other example herein, further comprising: receiving downlink data; and reporting HARQ corresponding to the downlink data based on the configuration.

Example 34 includes the method of example 31 or some other example herein, wherein the indication is to indicate that the UE supports HARQ feedback disabling and further indicates a supported maximum number of HARQ process with feedback disabled.

Example 35 includes a method of operating a user equipment (UE), the method comprising: acquiring first ephemeris; receiving one or more timing advance (TA) commands within a period of time; and acquiring the second ephemeris based on said receiving of the one or more TA commands.

Example 36 includes the method of example 35 or some other example herein, further comprising: detecting a condition based on a determination that the one or more TA commands is greater than a threshold number of TA commands; and acquiring the second ephemeris based on detecting the condition.

Example 37 includes the method of example 36 or some other example herein, further comprising: receiving, in radio resource control (RRC) signaling or system information signaling, information to configure the period of time or the threshold number of TA commands.

Example 38 includes the method of example 36 or some other example herein, wherein the period of time or the threshold number of TA commands is based on a type of non-terrestrial device (NTN device) that corresponds to the first ephemeris.

Example 39 includes the method of example 35 or some other example herein, further comprising: detecting a condition based on a determination that an accumulated TA adjustment from the one or more TA commands is greater than a threshold TA adjustment; and acquiring the second ephemeris based on detecting the condition.

Example 40 may include an apparatus comprising means to perform one or more elements of a method described in or related to any of examples 1-39, or any other method or process described herein.

Example 41 may include one or more non-transitory computer-readable media comprising instructions to cause an electronic device, upon execution of the instructions by one or more processors of the electronic device, to perform one or more elements of a method described in or related to any of examples 1-39, or any other method or process described herein.

Example 42 may include an apparatus comprising logic, modules, or circuitry to perform one or more elements of a method described in or related to any of examples 1-39, or any other method or process described herein.

Example 43 may include a method, technique, or process as described in or related to any of examples 1-39, or portions or parts thereof.

Example 44 may include an apparatus comprising: one or more processors and one or more computer-readable media comprising instructions that, when executed by the one or more processors, cause the one or more processors to perform the method, techniques, or process as described in or related to any of examples 1-39, or portions thereof.

Example 45 may include a signal as described in or related to any of examples 1-39, or portions or parts thereof.

Example 46 may include a datagram, information element, packet, frame, segment, PDU, or message as described in or related to any of examples 1-39, or portions or parts thereof, or otherwise described in the present disclosure.

Example 47 may include a signal encoded with data as described in or related to any of examples 1-39, or portions or parts thereof, or otherwise described in the present disclosure.

Example 48 may include a signal encoded with a datagram, IE, packet, frame, segment, PDU, or message as described in or related to any of examples 1-39, or portions or parts thereof, or otherwise described in the present disclosure.

Example 49 may include an electromagnetic signal carrying computer-readable instructions, wherein execution of the computer-readable instructions by one or more processors is to cause the one or more processors to perform the method, techniques, or process as described in or related to any of examples 1-39, or portions thereof.

Example 50 may include a computer program comprising instructions, wherein execution of the program by a processing element is to cause the processing element to carry out the method, techniques, or process as described in or related to any of examples 1-39, or portions thereof.

Example 51 may include a signal in a wireless network as shown and described herein.

Example 52 may include a method of communicating in a wireless network as shown and described herein.

Example 53 may include a system for providing wireless communication as shown and described herein.

Example 54 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:

processor circuitry to:

determine a timing advance (TA);

receive a user equipment (UE)-specific offset value;

compare a difference between the UE-specific offset value and the TA to at least one predetermined threshold;

detect a report trigger based on the comparison of the difference to the at least one predetermined threshold; and generate a report for transmission to a base station based on the report trigger; and interface circuitry coupled to the processor circuitry to transmit the report.

2. The apparatus of claim 1, wherein the report includes an indication of the TA with a slot granularity.

3. The apparatus of claim 1, wherein the report trigger is a trigger to update the UE-specific offset value.

4. The apparatus of claim 1, wherein the report includes a request to decrease the UE-specific offset value by an increment, by an indicated value, or to an indicated value.

5. The apparatus of claim 1, wherein the difference between the UE-specific offset value and the TA is greater than a first predetermined threshold of the at least one predetermined threshold.

6. The apparatus of claim 1, wherein the at least one predetermined threshold is: based on a subcarrier spacing; signaled in a radio resource control (RRC) configuration; or signaled in a system information block (SIB).

7. The apparatus of claim 1, wherein the TA is a first number of slots and the UE-specific offset value is a second number of slots; or the TA is a first number of milliseconds and the UE-specific offset value is a second number of milliseconds.

8. The apparatus of claim 1, wherein the processor circuitry is to:

receive an update to the UE-specific offset value.

9. A method comprising:

receiving, via radio resource control (RRC) signaling, an indication of a threshold;

determining a first timing advance (TA);

comparing a difference between the first TA and a second TA to the threshold;

detecting a report trigger based on comparing the difference to the threshold; and generating a report for transmission to a base station based on the report trigger.

10. The method of claim 9, wherein the report includes an indication of the TA with a slot granularity.

11. The method of claim 9, further comprising:

determining the second TA before determining the first TA, wherein the difference is an absolute value of the first TA minus the second TA.

12. The method of claim 9, wherein the report trigger is a trigger to update a UE-specific offset value.

13. The method of claim 9, further comprising:

receiving a UE-specific offset value;

comparing a difference between the UE-specific offset value and the TA to one or more predetermined thresholds; and detecting the report trigger based on comparison of the difference to the one or more predetermined thresholds.

14. An apparatus comprising:

processor circuitry to:

generate, for transmission to a user equipment (UE), a radio resource control (RRC) signal with an indication of a threshold to be used to trigger a report from the UE; and receive the report from the UE, the report to include an indication of a timing advance (TA) with a slot granularity; and interface circuitry coupled with the processor circuitry to enable communication.

15. The apparatus of claim 14, wherein the circuitry is further to:

update a UE-specific offset value based on the indication of the TA.

* * * * *